(12) United States Patent
Cunningham et al.

(10) Patent No.: US 6,432,249 B1
(45) Date of Patent: Aug. 13, 2002

(54) EXTRUSION DIE AND METHOD

(75) Inventors: George M. Cunningham, Horseheads; Lawrence S. Rajnik, Corning, both of NY (US)

(73) Assignee: Corning Inorporated, Corning, NY (US)

( * ) Notice: Subject to any disclaimer, the term of this patent is extended or adjusted under 35 U.S.C. 154(b) by 0 days.

(21) Appl. No.: 09/454,480

(22) Filed: Dec. 3, 1999

(51) Int. Cl.$^7$ ............................................. B32B 31/14
(52) U.S. Cl. ..................... 156/257; 156/256; 156/290; 425/461; 425/462
(58) Field of Search .................. 156/257, 256, 156/153, 290; 425/461, 462, 463, 464; 264/177.11, 177.12

(56) References Cited

U.S. PATENT DOCUMENTS

| | | | |
|---|---|---|---|
| 3,790,654 A | 2/1974 | Bagley .................. | 264/177 |
| 4,354,820 A | * 10/1982 | Yamamoto et al. ......... | 425/461 |
| 4,550,005 A | 10/1985 | Kato ......................... | 264/177 |
| 4,731,010 A | * 3/1988 | Cunningham .............. | 425/461 |
| 4,875,264 A | 10/1989 | Inoue et al. ............... | 29/163.6 |
| 5,487,863 A | 1/1996 | Cunningham et al. . | 264/177.11 |
| 5,761,787 A | * 6/1998 | Kragle et al. .................. | 29/418 |

FOREIGN PATENT DOCUMENTS

JP         57-17331        10/1982

* cited by examiner

*Primary Examiner*—Mark A. Osele
*Assistant Examiner*—Cheryl N. Hawkins
(74) *Attorney, Agent, or Firm*—Silvy A. Murphy; Kees van der Sterre (57) ABSTRACT

A method for making a composite extrusion die for making a cellular honeycomb structure with thin cell walls. The method includes the steps of drilling a grid of separate feed holes/channels into an inlet face of an extrusion die base element, and cutting a grid of intersecting primary outlet slots into an outlet face of the base element, where every alternate one of the primary outlet slots is in direct communication with a plurality of the feed channels. Further, the method includes cutting a grid of intersecting secondary outlet slots into the outlet face, where each one of the secondary outlet slots bisects each one of the primary outlet slots. The method further includes scoring a plurality of indentations into that region of the outlet face that does not contain any of the primary and secondary outlet slots, and filling each of the feed channels and each of the primary and secondary outlet slots with a filler material. Further, the method includes placing a bonding material onto the outlet face and into each of the plurality of indentations, and permanently attaching to the outlet face, a first side of a capping plate having a plate thickness not greater than 0.060 inches. Finally, the method includes cutting through the capping plate a grid of cap slots having a slot width not greater than 0.007 inches. The method further comprises eliminating the filler material from each of the feed channels and each of the primary and secondary outlet slots.

9 Claims, 5 Drawing Sheets

EXTRUSION DIE AND METHOD

FIELD OF THE INVENTION

The present invention relates to extrusion dies and a method for making a cellular honeycomb structure, particularly, ceramic honeycomb structures for use as catalytic converters in the exhaust stream of internal combustion engines. While the invention may be used in other types of dies, it is especially suited for use in extrusion dies for manufacturing high cell density thin-walled honeycomb structures from an extrudable material, such as ceramic, and will be particularly described in that connection.

BACKGROUND OF THE INVENTION

Dies having thin slot widths, that is, slot widths under 0.007 inches are difficult and costly to machine. As the slot width decreases, the tooling used for generating the slot needs to be reduced accordingly. Generally, the tooling blades are thin disc blades/cutters that are approximately two inches round in diameter. Reducing the thickness of the tooling blades tends to compromise the structural integrity of the tooling blades, making the blades somewhat weaker and a lot more difficult to control. Also, when the tooling blades are made thinner, the machining time is increased because the machining forces must be reduced to accommodate the reduced size of such thinner tooling blades. As a result, the quality of the die slots can be compromised. Alternatively, an electroplating process can be used to generate the die slots. In the electroplating process the material to be plated is carried in solution and a potential is used to move the material from the solution to the surface to be plated. If a large volume of solution is available at the surface of the part to be plated the plating material is readily replaced as it is deposited on the surface. When a die is plated, the solution must pass through the die to carry the plating material to the sides of the slots. As the passages become narrower, it becomes more difficult to move the solution through the die making it more difficult to adequately supply sufficient plating material along the entire passage. Also, as the surfaces being plated come closer together, the possibility of the plating material accumulating and bridging across the gap increases. This can prevent the material flowing through the die from forming a continuous web. In both approaches, there is no real indication of the success of the die until a product has been extruded and major expenses have been incurred.

Another problem with constructing thin slot dies is that the dimensions of the thin slots are determined by the dictates of the die design for the cellular product configuration. For example, if a die requires a slot depth of 0.100 inches, to insure good knitting of the extruded material, and to produce thin webs/walls in the product, this would mean that the thin slots would have to be cut to this depth of 0.100 inches. Since die slots are normally cut with a gang of disc blades/cutters assembled to the width of the product to be cut, at times there may be approximately 60 disc blades in an assembly. In such instances, trying to effectively cut a 0.003 inch slot width to a depth of 0.100 inches becomes very difficult, since some of the blades tend to shatter in the process.

In light of the foregoing, it is desirable to provide an extrusion die that can be used to form a cellular honeycomb structure with thin slots, and having a higher cell density. In addition, it is desirable to provide a device that incorporates an existing extrusion die in order to produce a quality cellular honeycomb structure with a higher cell density and thin walls. Furthermore, it is desirable to provide a more reliable method of making expensive extrusions dies for forming high cell density honeycomb structures with thin slots.

SUMMARY OF THE INVENTION

Accordingly, the present invention is directed to an extrusion die and a method of constructing an extrusion die that can be used to manufacture a surface area that substantially obviates one or surface area that substantially obviates one or more of the limitations and disadvantages of the related art. The principal advantage of the present invention is the provision of an arrangement that overcomes the limitations and disadvantages of the described prior arrangements. Additional features and advantages of the invention will be set forth in the description that follows, and in part will be apparent from the description, or may be learned by practice of the invention. The objectives and other advantages of the invention will be realized and attained by the apparatus particularly pointed out in the written description and claims hereof as well as the appended drawings.

The invention provides a method of capping a cellular extrusion die base element for extruding a cellular honeycomb structure having a plurality of cell walls, where each cell wall has a thickness not greater than 0.007 inches, preferably, a thickness that is approximately in the range of 0.002 inches to 0.007 inches, and most preferably, a thickness under 0.006 inches. The extrusion die base element is provided with a grid of separate feed holes/feed channels originating at an inlet face of the base element, and terminating at an outlet end within and proximate to an outlet face of the base element. Further, each of the feed channels are in direct communication with one of a matrix of intersecting pairs of primary outlet slots. In one embodiment, the base element further comprises another matrix of intersecting pairs of secondary outlet slots, where each one of the matrix of intersecting pairs of secondary outlet slots bisects each one of the matrix of intersecting pairs of primary outlet slots, and where the intersecting pairs of primary outlet slots and secondary outlet slots form a matrix of square shaped pins/pegs that terminate at the outlet face of the base element. The method further includes scoring a plurality of indentations or notches into that region of the outlet face of the base element that does not contain any of the intersecting pairs of primary outlet slots nor any of the secondary outlet slots. Alternatively, the scoring step includes scoring indentations or notches into a first side of the capping plate and scoring indentations or notches into that region of the outlet face of the base element that does not contain any of the intersecting pairs of primary outlet slots nor any of the secondary outlet slots. The method further includes filling a filler material into each of the feed channels. In an alternative embodiment, the method includes filling each of the feed channels and each of the primary outlet slots and secondary outlet slots with a filler material. The method further comprises placing a uniform layer of bonding material onto the outlet face of the base element and into each of the indentations and then permanently securing the first side of a capping plate to the outlet face of the base element to form a composite extrusion die. The method further comprises cutting a matrix of intersecting pairs of cap slots through the capping plate such that, at an inlet end of each of the cap slots, each of the cap slots is in direct communication with each of both the primary outlet slots and the secondary outlet slots and an opposite outlet end of each of the cap slots, terminates at an opposite outlet face of the composite extrusion die. Each of the cap slots are cut to have a slot width that is smaller than a slot width of each of the primary outlet slots and the secondary outlet slots, where the slot width of each of the cap slots is preferably not greater than 0.007 inches, preferably, a thickness approximately in the range of 0.002 inches to 0.007 inches, and most preferably, a thickness under 0.006 inches. Finally, the method comprises eliminating the filler material within each of the feed channels and within each of the primary outlet slots and the secondary outlet slots.

Additionally, the invention provides a method of making a composite cellular extrusion die for extruding a cellular honeycomb structure having cell walls with a thickness not greater than 0.007 inches, preferably, a thickness approximately in the range of 0.002 inches to 0.007 inches, and most preferably, a thickness under 0.006 inches. The method includes the steps of drilling a grid of separate feed holes/ channels originating at an inlet face of an extrusion die base element and terminating at an outlet end that is within and proximate to an outlet face of the base element. The method further comprises cutting a grid of intersecting primary outlet slots into the outlet face of the base element, where every alternate one of the grid of intersecting primary outlet slots is in direct communication with the outlet end of a plurality of the feed channels. Furthermore, the method includes cutting a grid of intersecting secondary outlet slots 34 into the outlet face of the base element, where each one of the grid of intersecting secondary outlet slots bisect each one of the grid of intersecting primary outlet slots. The method further includes scoring a plurality of indentations into that region of the outlet face of the base element that does not contain any of the primary outlet slots and secondary outlet slots, and filling each of the feed channels and each of the primary outlet slots and secondary outlet slots with a filler material. In an alternative embodiment, the scoring step includes scoring a plurality of indentations into a first side of the capping plate and scoring a plurality of indentations into that region of the outlet face of the base element that does not contain any of the intersecting pairs of primary outlet slots nor any of the secondary outlet slots. Further, the method includes placing a bonding material onto the outlet face of the base element and into each of the plurality of indentations. Finally, the method includes permanently attaching, to the outlet face of the base element, a first side of a capping plate having a plate thickness not greater than 0.060 inches, preferably not greater than 0.025 inches, and cutting through the capping plate a grid of cap slots having a slot width not greater than 0.007 inches, preferably, a thickness approximately in the range of 0.002 inches to 0.007 inches, and most preferably, a thickness under 0.006 inches, such that, an inlet end of each of the cap slots is in direct communication with one of the grids of intersecting pairs of primary outlet slots and an outlet end of each of the cap slots terminates at an outlet face of the composite die, where each of the secondary outlet slots has a slot width that is at least equal to the slot width of each of the primary outlet slots, and where each of the secondary outlet slots has a slot depth that is less than a slot depth of each of the primary outlet slots. In a preferred embodiment, each of the secondary outlet slots has a slot width that is larger than the slot width of each of the primary outlet slots. The method further comprises eliminating the filler material from each of the feed channels and each of the primary outlet slots and secondary outlet slots. Furthermore, the method includes, prior to the attaching step, first extruding an extrudable material through the base element to test the performance of the base element in forming a test cellular honeycomb structure.

In yet another embodiment, the invention provides a method of making a cellular honeycomb structure having a plurality of cell walls with a thickness not greater than 0.007 inches, preferably, a thickness approximately in the range of 0.002 inches to 0.007 inches, and most preferably, a thickness under 0.006 inches. The method comprises the steps of providing the base element with a grid of separate feed channels originating at an inlet face of the base element and terminating at an outlet end within and proximate to an outlet face of the base element. The feed channels are in direct communication with one of a matrix of intersecting pairs of primary outlet slots, where each one of the matrix of intersecting pairs of primary outlet slots is in direct communication with each one of the matrix of intersecting pairs of secondary outlet slots. The method further comprises scoring a plurality of indentations into that region of the outlet face of the base element that does not contain any of the primary outlet slots and secondary outlet slots, and filling each of the feed channels and each of the primary outlet slots and secondary outlet slots of the base element with a filler material. The method further comprises placing a bonding material onto the outlet face of the base element and into each of the indentations, and permanently bonding a capping plate having a thickness not greater than 0.0025 inches to the outlet face of the base element to form a composite die structure. Additionally, the method comprises cutting a matrix of intersecting pairs of cap slots through the capping plate, such that an inlet end of each of the cap slots within the composite die structure is in direct communication with each of the primary outlet slots and an opposite outlet end of each of the cap slots, terminates at an opposite outlet face of the composite die structure. In one embodiment, each of the secondary outlet slots has a slot width that is at least equal to the slot width of each of the primary outlet slots, and each of the secondary outlet slots has a slot depth that is less than a slot depth of each of the primary outlet slots. In a preferred embodiment, each of the secondary outlet slots has a slot width that is larger than the slot width of each of the primary outlet slots. Further, each of the cap slots has a slot width that is smaller than a slot width of each of the primary outlet slots. Finally, the method includes the step of extruding an extrudable material out through the cap slots, where each of the cap slots has a slot width, preferably, not greater than 0.007 inches.

To achieve these and other advantages and in accordance with the purpose of the invention, as embodied and broadly described, the extrusion die is for making a cellular ceramic honeycomb structure used in catalytic systems. Furthermore, a method is provided for making the extrusion die and for making the honeycomb structure using the extrusion die of the present invention.

DESCRIPTION OF THE PREFERRED EMBODIMENTS

The invention disclosed herein generally embodies the provision of a composite cellular extrusion die for manufacturing a cellular honeycomb structure used as catalytic converters in the exhaust stream of internal combustion engines. More specifically, an aspect of the invention resides in providing a composite cellular extrusion die that is suited for manufacturing a cellular honeycomb structure having a standard cell density.

In a broad aspect, the invention provides a method of making a thin-slot composite extrusion die by securing, to the outlet face of an existing extrusion die base element having a plurality of intersecting discharge/outlet slots, a thin capping plate that is approximately 0.060 inches thick, preferably, in the range of 0.010 inches and 0.025 inches, and most preferably, less than 0.025 inches thick. The method includes cutting intersecting cap slots through the capping plate and into the intersecting outlet slots of the extrusion die base element, such that, the cap slots are smaller in width than each of the intersecting outlet slots of the extrusion die base element. In a preferred embodiment, the slot width of each of the cap slots is less than 0.100 inches thick, preferably, not greater than 0.007 inches, and most preferably, less than 0.006 inches. The extrusion die base element is either a standard-slot type, that is, having a single set of intersecting outlet slots or a compound-slot type, that is, having two different sets of intersecting outlet slots. If the base element is a standard-slot die base element, then the capping plate can be positioned such that the cap slots that are cut into the capping plate are aligned with every one or with every other one of the intersecting outlet slots of the die. Similarly, if the base element is a compound-slot die base element, then the cap slots that are cut into the capping plate are cut so that the cap slots are aligned with the intersecting outlet slots chosen from either one of the two different sets of intersecting outlet slots or even both sets of intersecting outlet slots of the base die base element. When such a thin-slot composite extrusion die is used to manufacture a honeycomb structure, the knitting/formation of the cell walls of the honeycomb structure is dictated primarily by the intersecting outlet slots in the extrusion die base element, whereas, the thickness or width of the cell walls of the honeycomb structure is dictated by the width of the cap slots of the capping plate. Thus, the present invention provides a method of making a cellular honeycomb structure with cell walls having a thickness not greater than 0.007 inches, preferably, a thickness approximately in the range of 0.002 inches to 0.007 inches, and most preferably, a thickness less than 0.006 inches.

Figure 1:
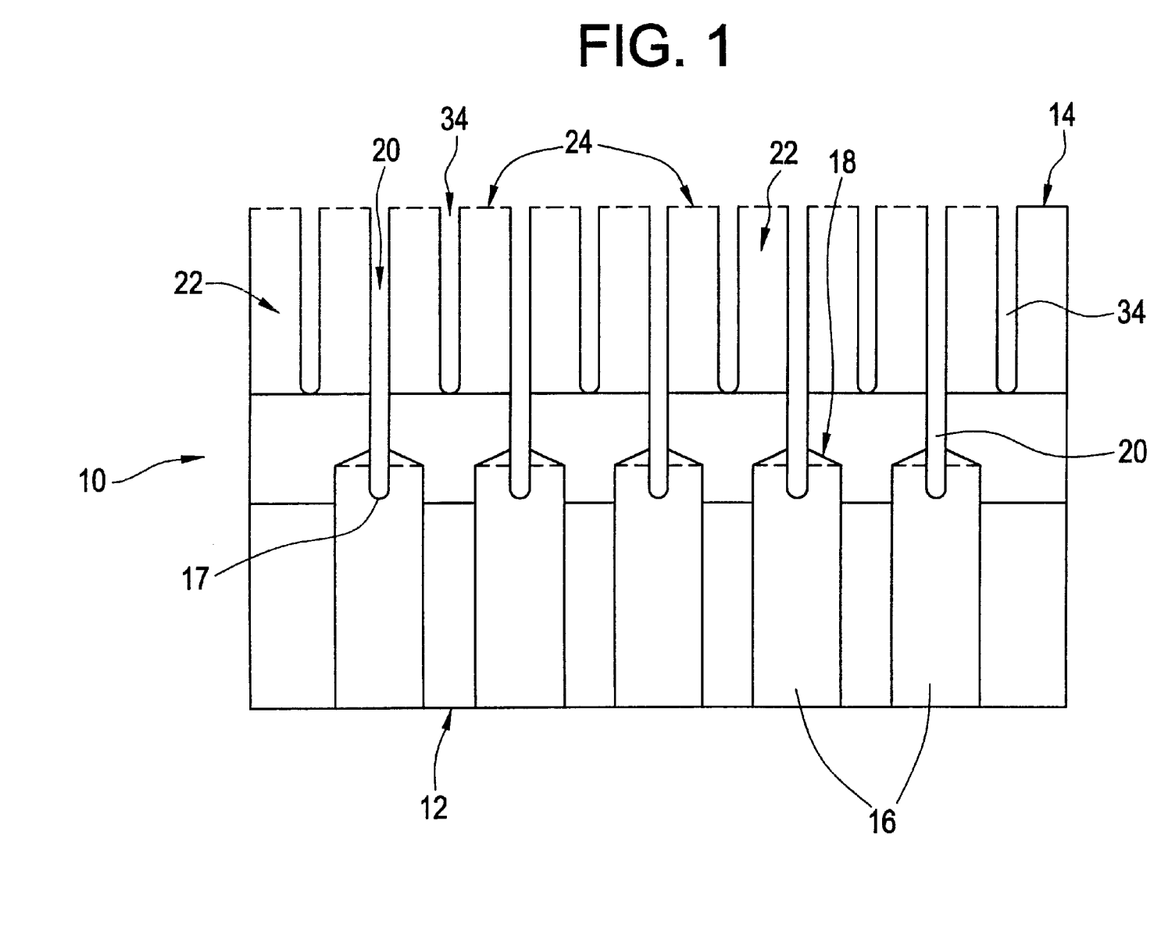
FIG. 1 is a partial side view of a compound-slot extrusion die base element without a capping plate in accordance with an embodiment of the present invention.

Reference will now be made in detail to the present preferred embodiments of the invention, examples of which are illustrated in the accompanying drawings. Turning to the drawings, like numerals indicate the same or similar elements in each of the several views. The drawings are not intended to indicate scale or relative proportions of the elements shown therein. FIG. 1 depicts a partial side view of a compound-slot extrusion die base element. The compound-slot extrusion die base element is designated generally by reference numeral 10, whereas, the standard-slot extrusion die base element is designated generally by reference numeral 10'.

The invention provides a method of capping a cellular extrusion die base element 10 for extruding a cellular honeycomb structure (not shown in any of the drawings) having a plurality of cell walls, where each cell wall has a thickness not greater than 0.007 inches, preferably, a thickness that is approximately in the range of 0.002 inches to 0.007 inches, and most preferably, a thickness less than 0.006 inches. The extrusion die base element 10 (shown in FIG. 1) is provided with a grid of separate feed holes/feed channels 16 originating at an inlet face 12 of the base element 10, and terminating at an outlet end 18 within and proximate to an outlet face 14 of the base element 10. Further, each of the feed channels 16 are in direct communication with one of a matrix of intersecting pairs of primary outlet slots 20. In one embodiment, the base element 10 further comprises another matrix of intersecting pairs of secondary outlet slots 34, where each one of the matrix of intersecting pairs of secondary outlet slots 34 bisects each one of the matrix of intersecting pairs of primary outlet slots 20, and where the intersecting pairs of primary outlet slots 20 and secondary outlet slots 34 form a matrix of square shaped pins/pegs 22 (shown in FIGS. 1, 2A and 3A) that terminate at the outlet face 14 of the base element 10. The method further includes scoring a plurality of indentations or notches 24 (shown in FIG. 1) into that region of the outlet face 14 of the base element 10 that does not contain any of the intersecting pairs of primary outlet slots 20 nor any of the secondary outlet slots 34. Alternatively, the scoring step includes scoring indentations or notches into a first side 26A of the capping plate 26 and scoring indentations or notches 24 into that region of the outlet face 14 of the base element 10 that does not contain any of the intersecting pairs of primary outlet slots 20 nor any of the secondary outlet slots 34. The method further includes filling a filler material 36 (not shown in any of the drawings) into each of the feed channels 16. In an alternative embodiment, the method includes filling each of the feed channels 16 and each of the primary outlet slots 20 and secondary outlet slots 34 with a filler material 36. The method further comprises placing a uniform layer of bonding material 38 onto the outlet face 14 of the base element 10 and into each of the indentations 24 (shown in FIGS. 2B and 3B) and then permanently securing the first side 26A of a capping plate 26 (shown in FIGS. 2A through 3B) to the outlet face 14 of the base element 10 to form a composite extrusion die 30. The method further comprises cutting a matrix of intersecting pairs of cap slots 28 through the capping plate 26 such that, at an inlet end of each of the cap slots 28, each of the cap slots 28 is in direct communication with each of both the primary outlet slots 20 and the secondary outlet slots 34 (shown in FIG. 3B) and an opposite outlet end of each of the cap slots 28, terminates at an opposite outlet face 32 of the composite extrusion die 30. Each of the cap slots 28 are cut to have a slot width that is smaller than a slot width of each of the primary outlet slots 20 and the secondary outlet slots 34, where the slot width of each of the cap slots 28 is preferably not greater than 0.007 inches, preferably, a thickness approximately in the range of 0.002 inches to 0.007 inches, and most preferably, a thickness less than 0.006 inches. Finally, the method comprises eliminating the filler material 36 within each of the feed channels 16 and within each of the primary outlet slots 20 and the secondary outlet slots 34.

Figure 2A:
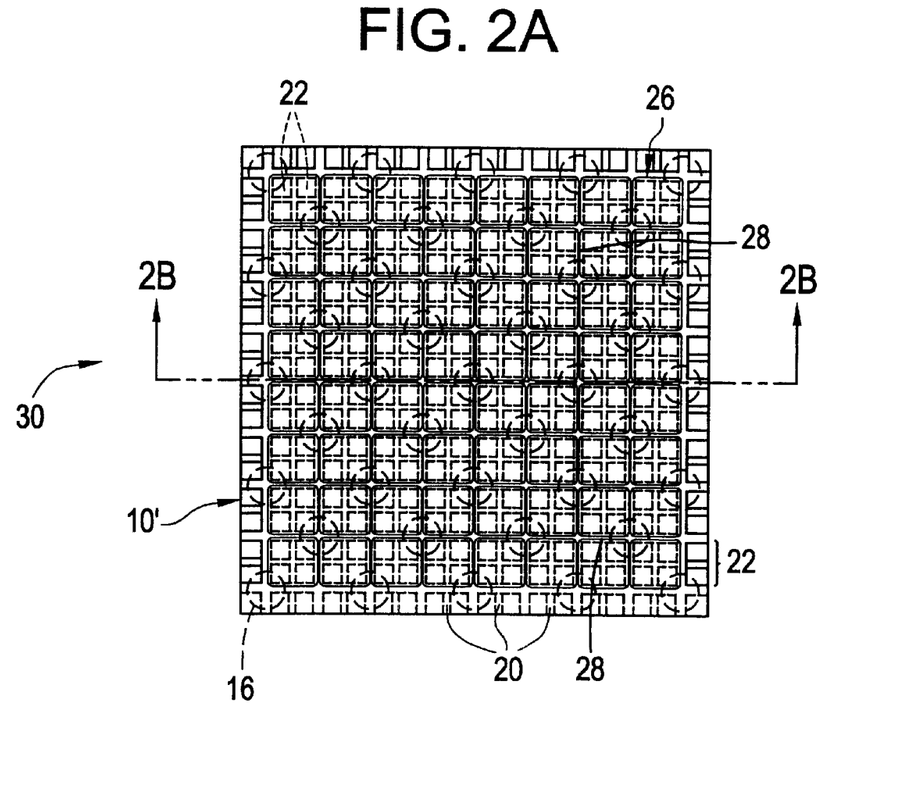
FIG. 2A is a partial plan view of a composite standard-slot extrusion die demonstrating an embodiment of the present invention.
Figure 2B:
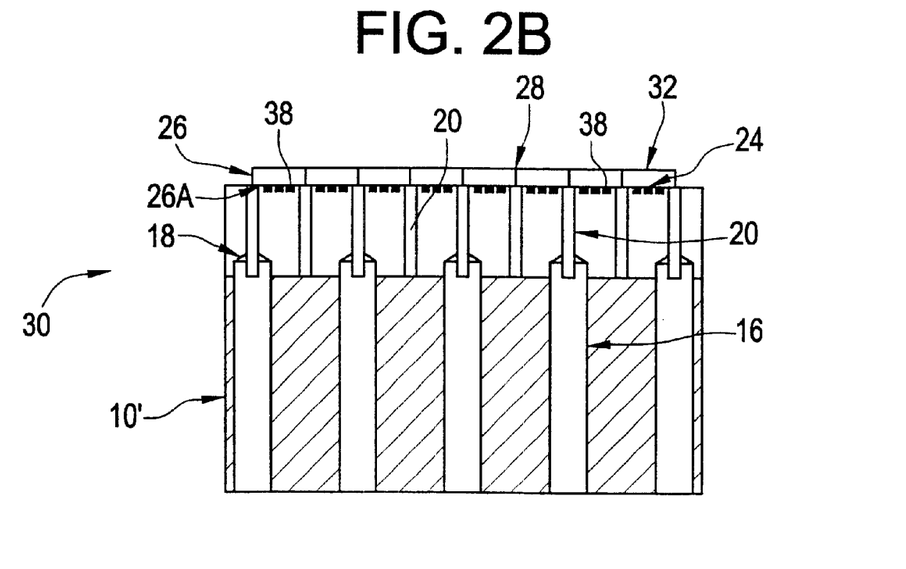
FIG. 2B is a partial side view of the composite standard-slot extrusion die taken along line 11—11 of FIG. 2A.
Figure 3A:
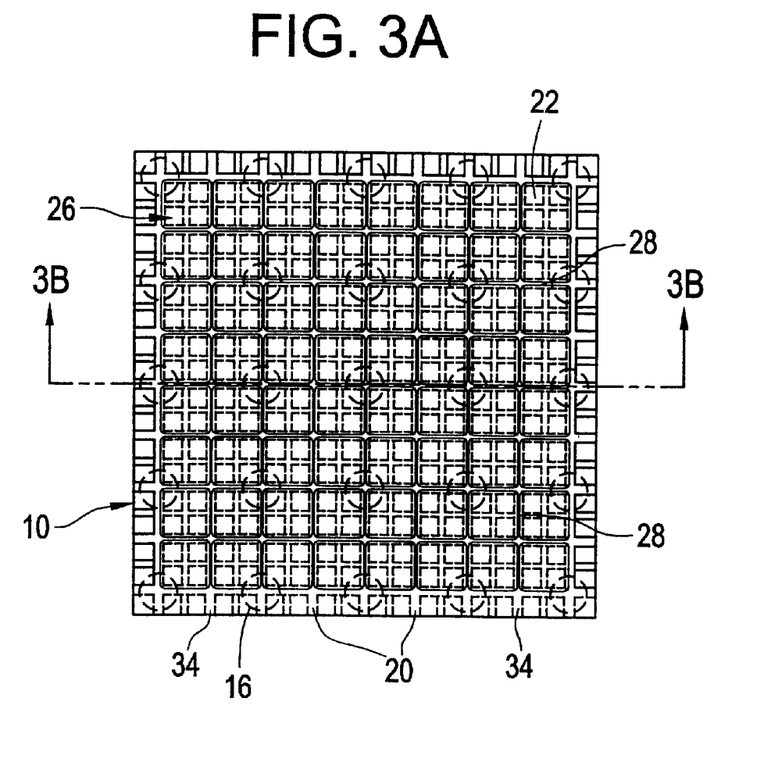
FIG. 3A is a partial plan view of a composite compound-slot extrusion die demonstrating an embodiment of the present invention.
Figure 3B:
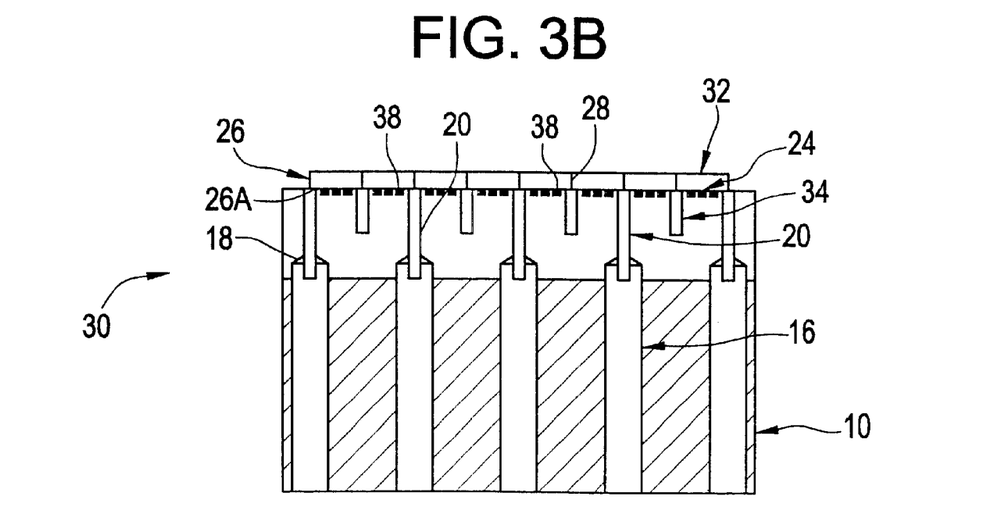
FIG. 3B is a partial side view of the composite extrusion die base element taken along line 13—13 of FIG. 3A.
Figure 4:
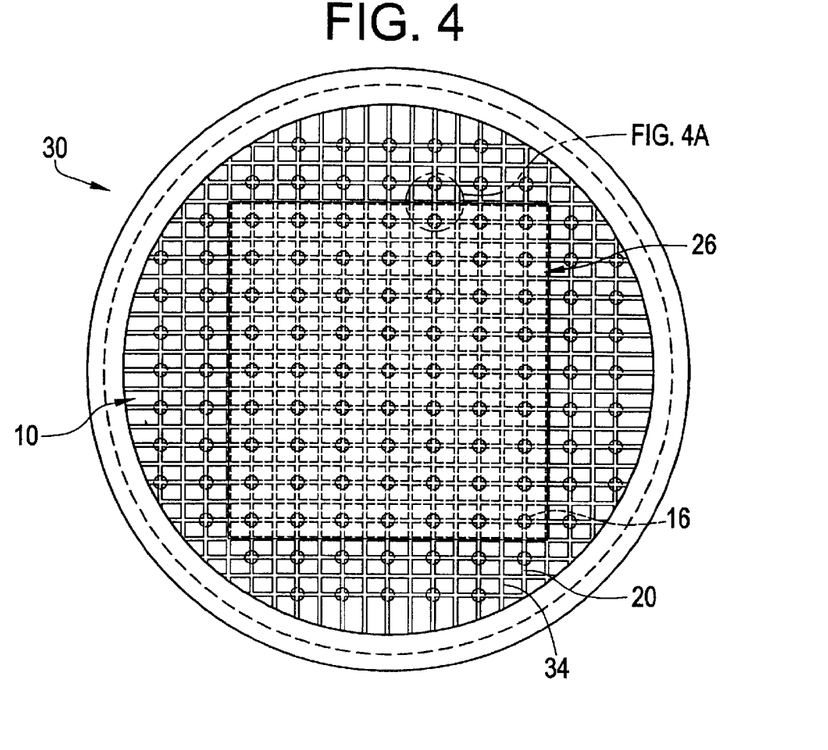
FIG. 4 is a plan view of a composite compound-slot extrusion die before the cutting of cap slots in the capping plate in accordance with an embodiment of the present invention.
Figure 4A:
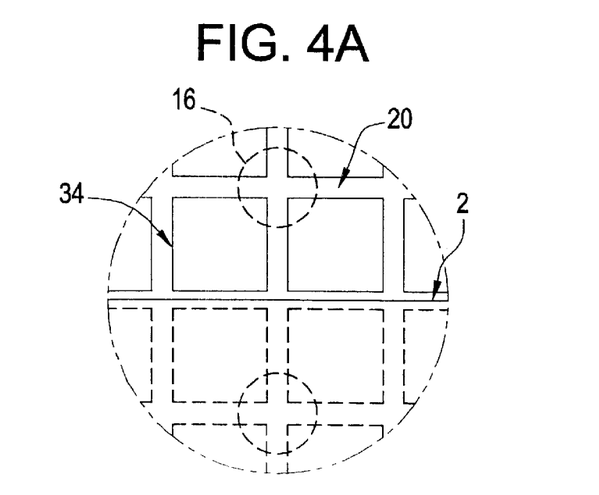
FIG. 4A is a magnified view of a section of the composite compound-slot extrusion die shown in FIG. 4.
Figure 5:
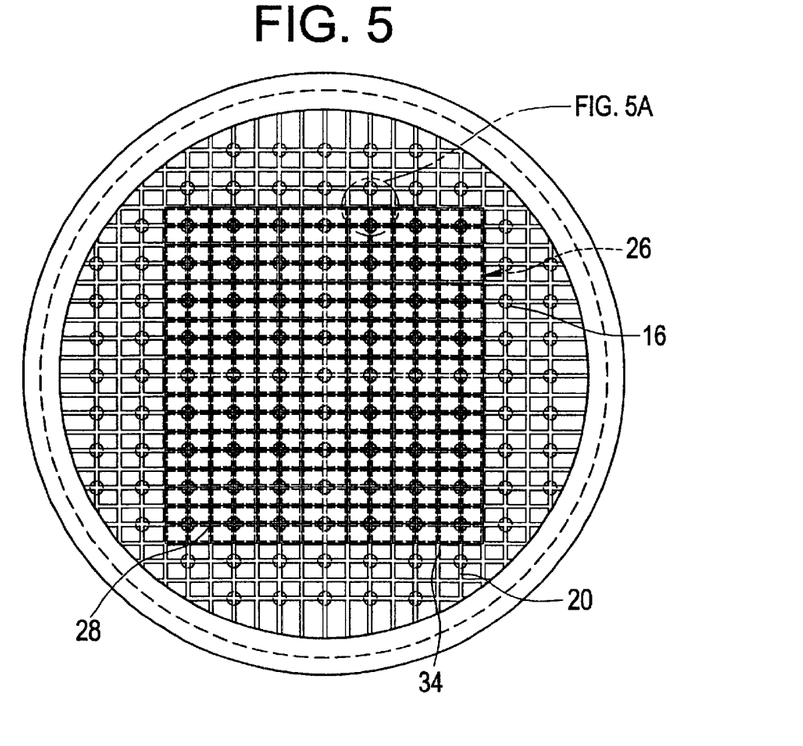
FIG. 5 is a plan view of a composite compound-slot extrusion die after the cutting of cap slots in the capping plate in accordance with an embodiment of the present invention.
Figure 5A:
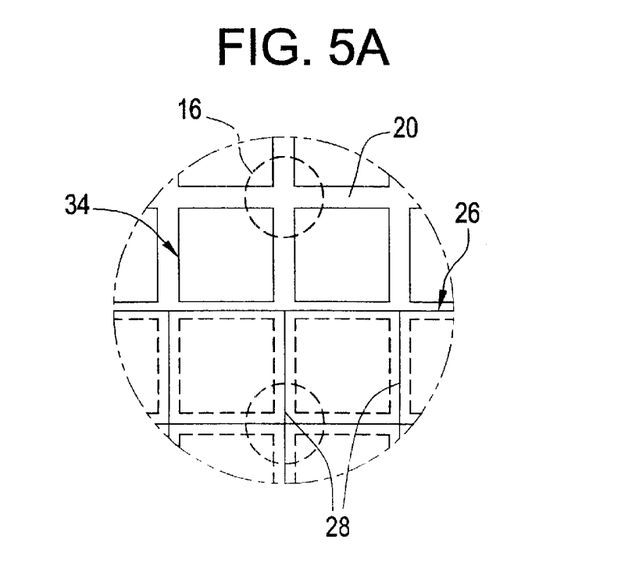
FIG. 5A is a magnified view of a section of the composite compound-slot extrusion die shown in FIG. 5.

Although, FIGS. 1, 3A and 3B show and describe the invention utilizing a compound-slot extrusion die base element 10, the invention can be practiced with a standard-slot extrusion die base element 10' (shown in FIGS. 2A and 2B). The standard-slot extrusion die base element 10' differs from the compound-slot extrusion die base element 10 in that the base element 10' comprises only a matrix of intersecting pairs of primary outlet slots 20 and not the secondary outlet slots 34. Further, in the standard-slot die base element 10', the scoring step includes scoring that region of the outlet face 14 of the base element 10' that does not contain any of the primary outlet slots 20 (see FIG. 2A). Alternatively, the scoring step includes scoring that region of the outlet face 14 of the base element 10' that does not contain any of the primary outlet slots 20 and scoring a first side 26A of the capping plate 26. Moreover, in a preferred embodiment, the securing step includes filling each of the feed channels 16, and preferably also each of the primary outlet slots 20 of the base element 10' with a filler material 36, and then placing a bonding material 38 onto the outlet face 14 of the base element 10' and into each of the indentations 24. Finally, the method includes the step of eliminating the filler material 36 within each of the feed channels 16 and within each of the primary outlet slots 20.

Additionally, the invention provides a method of making a composite cellular extrusion die 30 for extruding a cellular honeycomb structure having cell walls with a thickness not greater than 0.007 inches, preferably, a thickness approximately in the range of 0.002 inches to 0.007 inches, and most preferably, a thickness less than 0.006 inches. The method includes the steps of drilling a grid of separate feed holes/channels 16 originating at an inlet face 12 of an extrusion die base element 10 and terminating at an outlet end 18 that is within and proximate to an outlet face 14 of the base element 10. The method further comprises cutting a grid of intersecting primary outlet slots 20 into the outlet face 14 of the base element 10, where every alternate one of the grid of intersecting primary outlet slots 20 is in direct communication with the outlet end 18 of a plurality of the feed channels 16. Furthermore, the method includes cutting a grid of intersecting secondary outlet slots 34 into the outlet face 14 of the base element 10, where each one of the grid of intersecting secondary outlet slots 34 bisect each one of the grid of intersecting primary outlet slots 20. The method further includes scoring a plurality of indentations 24 into that region of the outlet face 14 of the base element 10 that does not contain any of the primary outlet slots 20 and secondary outlet slots 34, and filling each of the feed channels 16 and each of the primary outlet slots 20 and secondary outlet slots 34 with a filler material. In an alternative embodiment, the scoring step includes scoring a plurality of indentations into a first side 26A of the capping plate 26 and scoring a plurality of indentations 24 into that region of the outlet face 14 of the base element 10 that does not contain any of the intersecting pairs of primary outlet slots 20 nor any of the secondary outlet slots 34. Further, the method includes placing a bonding material 38 onto the outlet face 14 of the base element 10 and into each of the plurality of indentations 24. Finally, the method includes permanently attaching, to the outlet face 14 of the base element 10, a first side 26A of a capping plate 26 having a plate thickness not greater than 0.060 inches, preferably, in the range of 0.010 inches and 0.025 inches, and most preferably, not greater than 0.025 inches, and cutting through the capping plate 26 a grid of cap slots 28 having a slot width not greater than 0.007 inches, preferably, a thickness approximately in the range of 0.002 inches to 0.007 inches, and most preferably, a thickness less than 0.006 inches, such that, an inlet end of each of the cap slots 28 is in direct communication with one of the grids of intersecting pairs of primary outlet slots 20 and an outlet end of each of the cap slots 28 terminates at an outlet face 32 of the composite die 30, where each of the secondary outlet slots 34 has a slot width that is at least equal to the slot width of each of the primary outlet slots 20, and where each of the secondary outlet slots 34 has a slot depth that is less than a slot depth of each of the primary outlet slots 20. In a preferred embodiment, each of the secondary outlet slots 34 has a slot width that is larger than the slot width of each of the primary outlet slots 20, which better promotes the flow of an extrudable material through the secondary outlet slots 34. The method further comprises eliminating the filler material from each of the feed channels 16 and each of the primary outlet slots 20 and secondary outlet slots 34. Furthermore, the method includes, prior to the attaching step, first extruding an extrudable material through the base element 10 to test the performance of the base element 10 in forming a test cellular honeycomb structure.

In yet another embodiment, the invention provides a method of making a cellular honeycomb structure having a plurality of cell walls with a thickness not greater than 0.007 inches, preferably, a thickness approximately in the range of 0.002 inches to 0.007 inches, and most preferably, a thickness less than 0.006 inches. The method comprises the steps of providing the base element 10 with a grid of separate feed channels 16 originating at an inlet face 12 of the base element 10 and terminating at an outlet end 18 within and proximate to an outlet face 14 of the base element 10. The feed channels 16 are in direct communication with one of a matrix of intersecting pairs of primary outlet slots 20, where each one of the matrix of intersecting pairs of primary outlet slots 20 is in direct communication with each one of the matrix of intersecting pairs of secondary outlet slots 34. The method further comprises scoring a plurality of indentations 24 into that region of the outlet face 14 of the base element 10 that does not contain any of the primary outlet slots 20 and secondary outlet slots 34, and filling each of the feed channels 16 and each of the primary outlet slots 20 and secondary outlet slots 34 of the base element 10 with a filler material. The method further comprises placing a bonding material 38 onto the outlet face 14 of the base element 10 and into each of the indentations 24, and permanently bonding, to the outlet face 14 of the base element 10, a capping plate 26 having a thickness not greater than 0.060 inches, preferably, in the range of 0.010 inches and 0.025 inches, and most preferably, not greater than 0.025 inches to form a composite die structure 30. Additionally, the method comprises cutting a matrix of intersecting pairs of cap slots 28 through the capping plate 26, such that an inlet end of each of the cap slots 28 within the composite die structure 30 is in direct communication with each of the primary outlet slots 20 and an opposite outlet end of each of the cap slots 28, terminates at an opposite outlet face 14 of the composite die structure 30. In a preferred embodiment, each of the cap slots 28 has a slot width that is smaller than a slot width of each of the primary outlet slots 20 and each of the secondary outlet slots 34. Finally, the method includes the step of extruding an extrudable material out through the cap slots 28, where each of the cap slots 28 has a slot width, preferably, not greater than 0.007 inches.

Rather than construct an extrusion die 30 with slots of the final thickness, the invention provides a method of making extrusion dies by utilizing a die base element 10 having a single set of intersecting outlet slots 20 or alternatively having two sets of intersecting outlet slots 20 and 34, and then capping or permanently securing onto the outlet face 14 of the base element 10 a capping plate 26, that is preferably made of metal. This capping plate 26 is then slit with cap slots 28 that are narrower than the widths of both the intersecting outlet slots 20 and 34 of the base element 10. Hence, the base element 10 dictates the product geometry and the capping plate 26 sizes the thickness of the final cell walls of the honeycomb structure that is extruded. Also, since the capping plate 26 is secured onto either a standard-slot or a compound-slot extrusion die base element 10, the base element 10 can be previewed before capping to ensure good performance during the manufacturing process. Moreover, the capping plate 26 can be inspected before the capping plate 26 is bonded to ensure acceptable thickness, which is what determines the depth of the cap slots 28. Also, the material thickness can be selected to accommodate the capabilities of tooling having thin blades. Further, filling the indentations 24 on the outlet face 14 of the base element 10 with the bonding material 38 improves the bonding of the individual pins/pegs 22 on the outlet face 14 of the base element 10 to the capping plate 26. Moreover, if the base element 10 is a compound-slot die having both primary outlet slots 20 and secondary outlet slots 34, then alternatively, instead of scoring indentations 24 onto the outlet face 14 of the base element 10, the secondary outlet slots 34 can be filled with the bonding material 38 and then the capping plate 26 can be attached to the base element 10, and then the cap slots 28 can be cut through the capping plate 26 such that the cap slots 28 are in alignment with the primary outlet slots 20 and the secondary outlet slots 34. Another advantage of this capping method is that it is possible to expose the intersecting outlet slots 20 and 34 of the base element 10 by either selecting a capping plate 26 that does not completely cover the base element 10 or by machining away the edges of the capping plate 26 out of the extrusion region to expose the intersecting outlet slots 20 and 34. In this way, very thin cap slots 28 can be machined in alignment with the intersecting outlet slots 20 and 34 in the base element 10 to ensure slot symmetry and good performance.

In one embodiment of the invention, each of the extrusion die base elements 10 and 10' and the capping plate 26 is made of a metal, preferably steel or stainless steel. Also, in a preferred embodiment, the capping plate 26 has a thickness not greater than 0.060 inches, preferably, the capping plate 26 has a thickness in the range between 0.010 inches and 0.025 inches, and most preferably, not greater than 0.025 inches. Further, the thickness of each of the cell walls of the cellular honeycomb structure that is extruded from the composite extrusion die 30 is not greater than 0.007 inches, preferably, in the range of about 0.002 inches to 0.007 inches. For example, a 100 cell composite compound-slot extrusion die 30 used for making a honeycomb structure that has 400 cells per square inch with a cell wall thickness not greater than 0.007 inches can have primary outlet slots 20 with a slot width of approximately 0.010 inches and a slot depth of approximately 0.210 inches, whereas, the extrusion die 30 can have secondary outlet slots 34 with a slot width of approximately 0.010 inches and a slot depth of approximately 0.130 inches. In another example, a 150 cell composite compound-slot extrusion die 30 used for making a honeycomb structure that has 600 cells per square inch with a cell wall thickness not greater than 0.007 inches can have primary outlet slots 20 with a slot width of approximately 0.007 inches and a slot depth of approximately 0.151 inches, whereas, the extrusion die 30 can have secondary outlet slots 34 with a slot width of approximately 0.008 inches and a slot depth of approximately 0.094 inches. These dimensions for the extrusion die 30 are exemplary, as other dimensions will be apparent to those skilled in the art.

One concern when an extrusion die base element 10 or 10' is capped with a capping plate 26 is that the bonding material 38 used to hold the capping plate 26 to the base element 10 will accumulate in the intersecting outlet slots 20 and 34 (only intersecting outlet slots 20 when using an extrusion die base element 10') of the base element 10 and interfere with the flow of an extrudable material through the intersecting outlet slots 20 and 34. One method of capping the base element 10 or 10' would be to use a bonding material 38 to braze the capping plate 26 to the base element 10 or 10'. More specifically, this can be accomplished by plating a brazing material, such as copper, to the capping plate 26, so that the thickness of the plated material could be accurately controlled, hence, ensuring a good bond with a minimal amount of excess material. In this manner, any small amount of excess brazing material can easily be used also as a filler material that would fill in the notches/indentations 24 between the pins/pegs 22 and the capping plate 26 and would not interfere with the flow of the extrudable material through the composite extrusion die 30. This would result in a one step operation saving time and expense. Alternatively, if a bonding/adhesive material 38 is used to secure the capping plate 26 to the base element 10, and sufficient control of the placement of the adhesive/bonding material 38 on the capping plate 26 exists, then it would be possible to perform a similar assembly to that described above. However, if control of the bonding/adhesive material 38 is poor or if an excess of bonding/adhesive material 38 is used to ensure a good bond, then steps must be taken to ensure that the bonding/adhesive material 38 does not accumulate in the intersecting outlet slots 20 and 34. This can be done by using a filler material 36 to seal the intersecting outlet slots 20 and 34 prior to applying the bonding/adhesive material 38. In this case, the filler material 36 must then be removed from the intersecting outlet slots 20 and 34 after the bond is completed. There are several kinds of filler materials 36 that can be used. For instance, one type of filler material 36 that can be used is one that is either dissolved in water or attacked by a chemical, but in no way affects the bonding/adhesive material 38. In this way the filler material 36 can be removed without weakening the bond formed by the bonding/adhesive material 38. Alternatively, a filler material 36 that melts at a certain temperature, but does not adversely affect the bonding/adhesive material 38 can be used. For instance, once the bonding/adhesive material 38 has set, the composite extrusion die 30 can be heated to an appropriate temperature in a kiln or a furnace for removing the filler material 36 from the extrusion die 30. For example, a low melting point wax could be used as a filler material 36 and an epoxy adhesive or some other bonding adhesive that does not require a temperature above the melting point of the wax to activate the bond can be used as the bonding/adhesive material 38. However, removing the filler material 36 using a high temperature would not work if the bonding/adhesive material 38 requires a similar or higher temperature as that of the melting point of the filler material 36 to effectuate the bond. The problem is that the filler material 36 would be removed during the bonding process and would not be able to prevent the bonding/adhesive material 38 from entering the intersecting outlet slots 20 and 34. On the other hand, if the temperature required to remove the filler material 36 were higher than that which the bonding/adhesive material 38 can tolerate, the bond would be destroyed as the filler material 36 is removed, thus, causing the capping plate 26 to be released.

In a preferred embodiment, the cap slots 28 in the capping plate are slit using an EDM wire to cut through the capping plate 26 and into the intersecting outlet slots 20 and 34 of the base element 10. The bonding operation can be done by various techniques such as brazing, ionic bonding, or by using heat generating foils placed between the die and the capping plate to ensure a good bond with the outlet face 14 of the base element 10 without introducing excessive bonding material 38 into the intersecting outlet slots 20 and 34.

Further, the problem of any excessive bonding material 38 going into the intersecting outlet slots 20 and 34 is prevented by pre-filling the bottom of the feed holes 16 and the primary outlet slots 20 and the secondary outlet slots 34 with a filler material 36 such as a high temperature resistant material that can be removed after the bonding process is completed. Such a high temperature resistant filler material 36 can be removed for instance by exposing the composite extrusion die 30 to a high temperature kiln or a furnace.

Although a preferred embodiment of this invention and certain variations thereof have been described herein, various modifications and variations will be apparent to those skilled in the art without departing from the spirit or scope of the invention. Thus, it is intended that the present invention cover the modifications and variations of this invention provided they come within the scope of the appended claims and their equivalents.

What is claimed is:

1. A method of making a composite cellular extrusion die for extruding from an extrudable material a cellular honeycomb structure having a cell wall thickness not greater than 0.007 inches, said method comprising the steps of:

drilling a grid of separate feed channels originating at an inlet face of a die base element and terminating at an outlet end that is within and proximate to an outlet face of said die base element;

cutting a grid of intersecting primary outlet slots into said outlet face of said die base element, each one of said grid of intersecting primary outlet slots being in direct communication with a plurality of said feed channels;

cutting a grid of intersecting secondary outlet slots into said outlet face of said die base element, each one of said grid of intersecting secondary outlet slots bisecting each one of said grid of intersecting primary outlet slots, each of said secondary outlet slots having a slot width that is at least equal to a slot width of each of said primary outlet slots, each of said secondary outlet slots having a slot depth that is smaller than a slot depth of each of said primary outlet slots;

scoring a plurality of indentations into that region of said outlet face of said die base element that does not contain any of said primary and secondary outlet slots;

filling each of said feed channels and each of said primary outlet slots and secondary outlet slots with a filler material;

placing a bonding material onto said outlet face of said die base element and into each of said indentations;

permanently attaching a first side of a capping plate having a plate thickness not greater than 0.025 inches to said outlet face of said die base element to form a composite die structure; and cutting a grid of cap slots having a slot width not greater than 0.007 through said capping plate such that an inlet end of each of said cap slots is in direct communication with each one of said grid of intersecting pairs of primary outlet slots and secondary outlet slots, an outlet end of each of said cap slots terminating at an outlet face of said composite die structure, wherein each of said cap slots has a slot width that is smaller than a slot width of each of said primary and secondary outlet slots, and wherein each of said cap slots has a slot depth that is smaller than a slot depth of each of said primary and secondary outlet slots.

2. The method of claim 1, wherein said attaching step further comprises:

prior to attaching said capping plate, extruding an extrudable material through said die base element to test the performance of said die base element in forming a test cellular honeycomb structure.

3. The method of claim 1, further comprising:

eliminating said filler material from each of said feed channels and each of said primary and secondary outlet slots.

4. The method of claim 1, wherein said cell wall thickness of said cellular honeycomb structure that is extruded is in the range of about 0.002 inches to 0.007 inches.

5. The method of claim 1, wherein said slot width of each of said primary outlet slots is approximately 0.007 inches and said slot depth of each of said primary outlet slots is approximately 0.151 inches.

6. The method of claim 1, wherein said slot width of each of said secondary outlet slots is approximately 0.008 inches and said slot depth of each of said secondary outlet slots is approximately 0.094 inches.

7. A method of capping a cellular extrusion die base element for extruding a cellular honeycomb structure having a cell wall thickness not greater than 0.007 inches, said method comprising the steps of:

providing said die base element having a grid of separate feed channels originating at an inlet face of said die base element, each of said feed channels terminating at an outlet end within and proximate to an outlet face of said die base element, each of said feed channels being in direct communication with one of a matrix of intersecting pairs of primary outlet slots, said intersecting pairs of primary outlet slots forming a matrix of square-shaped pins that terminate at said outlet face of said die base element;

scoring a plurality of indentations into that region of said outlet face of said die base element that does not contain said intersecting pairs of primary outlet sots;

filling each of said feed channels and each of said primary outlet slots of said die base element with a filler material after filling with the filler material, permanently securing a first side of a capping plate to said outlet face of said die base element to form a composite extrusion die; and cutting a matrix of intersecting pairs of cap slots through said capping plate such that an inlet end of each of said cap slots within said composite extrusion die is in direct communication with each of said primary outlet slots and an opposite outlet end of each of said cap slots terminates at an opposite outlet face of said composite extrusion die, each of said cap slots having a slot width that is smaller than a slot width of each of said primary outlet slots;

wherein said slot width of each of said cap slots is not greater than 0.007 inches.

8. The method of claim 7 wherein said securing step includes:

placing a bonding material onto said outlet face of said die base element and into each of said indentations.

9. The method of claim 8 further comprising the step of:

eliminating said filler material from each of said feed channels and each of said primary outlet slots by placing said composite extrusion die having said filler material in a melting furnace.

* * * * *